United States Patent Office 3,538,223
Patented Nov. 3, 1970

3,538,223
β-(3-INDOLYLMETHYL)-BUTYRIC ACID
LACTONE COMPOSITIONS
Daniel Frederick Dickel, Berkeley Heights, and George deStevens, Summit, N.J., assignors to Ciba Corporation, New York, N.Y., a corporation of Delaware
No Drawing. Filed May 31, 1967, Ser. No. 642,310
Int. Cl. A01n 9/22
U.S. Cl. 424—274
2 Claims

ABSTRACT OF THE DISCLOSURE

β-(N-aminoalkyl-2-methyl-3-indolylmethyl)-γ-dimethyl-butyric acid lactones or salts thereof, in conjunction or admixture with pharmaceutical excipients, increase the contractive force of the heart.

SUMMARY OF THE INVENTION

The present invention concerns and has for its object the provision of new (1-aminoalkyl-3-indolyl)-hydroxyalkanoic acids, more particularly those of the Formula I

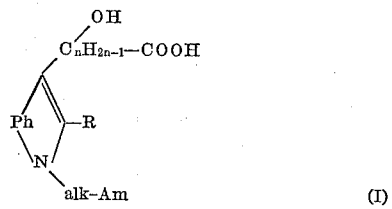

in which Ph stands for a 1,2-phenylene radical, $n$ for an integer the provision of new pharmaceutical compositions consisting essentially of a β-(N-aminoalkyl-2-methyl-3-indolylmethyl)-γ-dimethylbutyric acid lactone or a therapeutically useful acid addition salt thereof, which are useful cardiovascular agents, for example, in the treatment of congestive heart failure or myocardial failure, e.g. such following infarction.

DESCRIPTION OF THE PREFERRED EMBODIMENTS

Compositions that are especially valuable consist essentially of a compound of the Formula II

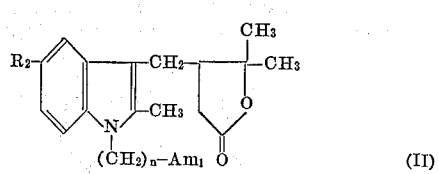

in which $n$ stands for the integer 2 or 3, $Am_1$ for dimethylamino, diethylamino, pyrrolidino, piperidino or morpholino and $R_2$ for hydrogen, methyl, fluoro or chloro, or a therapeutically useful acid addition salt thereof and a pharmaceutical excipient which, when given to anesthetized dogs at oral doses between about 5 and 25 mg./kg./day, show an outstanding and long-lasting increase of the contractive force of the heart, similar to the effect produced by digitoxin.

The active ingredients are prepared according to methods in themselves known. For example, the process for their preparation consists in (a) Reacting a reactive ester of the alcohol $X-(CH_2)_n-OH$ with the amine Y-H, in which one of X and Y stands for $Am_1$ and the other for the radical

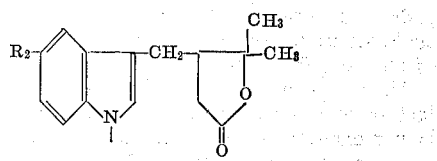

or a functional derivative thereof.

A reactive ester of the alcohols mentioned under item (a) is, for example, such derived from a mineral acid, e.g., hydrochloric, hydrobromic, hydriodic or sulfuric acid, or a sulfonic acid, such as an alkane- or benzenesulfonic acid, e.g., methane-, ethane- or p-toluenesulfonic acid.

The above-mentioned reactions are carried out according to standard methods, in the presence or absence of diluents, preferably such as are inert to the reagents and are solvent thereof, of catalysts, condensing agents and/or inert atmospheres, at low temperatures, room temperature or elevated temperatures, at atmospheric or superatmospheric pressure. Reactive esters are advantageously reacted with an excess of the corresponding amines or in the presence of other bases, preferably alkali metal carbonates or bicarbonates or tertiary nitrogen bases, such as trialkylamines, N,N-dialkyl-anilines or pyridines.

The compounds of the invention are obtained in the free form or in the form of their salts, depending on the conditions under which the process is carried out; the salts are also included in the present invention. Salts that are obtained can be converted into the free compounds in known manner, depending on their acidic or basic character, for example with the use of acids, alkalies or ion exchangers. Free acids that are obtained can be converted into their metal or ammonium salts, preferably with the use of alkali metal or alkaline metal hydroxides, carbonates or bicarbonates, ammonia or amines. Free bases that are obtained can be converted into salts by reaction with inorganic or organic acids, especially those that are suitable for the formation of therapeutically useful salts. Such acids are, for example, mineral acids, such as hydrohalic, e.g. hydrochloric or hydrobromic acid, sulfuric, phosphoric, nitric or perchloric acid, aliphatic, alicyclic, araliphatic, aromatic or heterocyclic carboxylic or sulfonic acids, such as, formic, acetic, propionic, succinic, glyollic, lactic, malic, tartaric, citric, ascorbic, maleic, hydroxymaleic pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The starting material used is known or, if new, may be prepared according to known methods. Thus, for example, that mentioned under item (a) in which YH is the 1-unsubstituted indole compound, may be obtained according to Fischer's indole synthesis.

Starting material or final products that are mixtures of isomers may be separated into single isomers by methods in themselves known. For example, compounds that contain one or more asymmetrical carbon atoms may be in the form of racemate mixtures, pure racemates or optical antipodes. Mixtures or racemates, by virtue of the physicochemical differences between the components, can be resolved into pure racemates, for example, by chromatography and/or fractional cystallization. Racemic products can likewise be resolved into the optical antipodes, for example, by reaction with optically active acids, separation of the diastereomeric salts and liberation of the bases from the salts.

The compounds of Formula II are used for the manufacture of pharmaceutical compositions containing them in conjuncttion or admixture with inorganic or organic, solid or liquid pharmaceutical excipients, suitable preferably for enteral or parenteral administratiton. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50% of the active ingredient.

The following examples illustrate the invention and are not to be construed as being limitations thereon. Temperatures are given in degrees centigrade and all parts wherever given are parts by weight.

EXAMPLE 1

The solution of 140 g. β-(2-methyl-3-indolylmethyl)-γ-dimethylbutyric acid lactone in 525 ml. dimethylformamide is added to the cooled mixture of 13.2 g. sodium hydride (as a suspension in mineral oil) and 525 ml. dimethylformamide, while stirring under nitrogen. The mixture is then stirred at room temperature for 3 hours, during which time additional 19.66 g. sodium hydride in mineral oil are added. After cooling 117.6 g. of 2-dimethylamino-ethyl chloride hydrochloride are added in small portions while stirring, whereupon the mixture is allowed to stand at room temperature for 3 days. After the addition of 2.7 liters diethyl ether, the mixture is stirred for 3 hours and filtered. The residue is washed with water, the organic solution separated, dried and acidified with 5 N ethanolic hydrochloric acid. The precipitate formed is separated and recrystallized from methanol, to yield the β-[N-(2-dimethylamino-ethyl)2-methyl-3-indolylmethyl]-γ-dimethylbutyric acid lactone hydrochloride of the formula

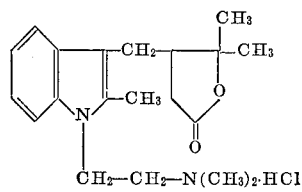

melting at 121–122°.

The starting material is prepared as follows: The solution of 55 g. phenylhydrazine hydrochloride in 1 liter water is added to the mixture of 69 g. of ε-oxo-β-(2-hydroxy-2-propyl)-heptanoic acid lactone, 60 g. potassium acetate and 650 ml. water while stirring under nitrogen. Stirring is continued for 2 hours at room temperature, whereupon 450 ml. concentrated sulfuric acid are added dropwise without cooling. The mixture is heated to about 80–90°, stirred for 2 hours and allowed to stand overnight at room temperature. The precipitate formed is filtered off, washed with water until the filtrate is neutral, recrystallized from methanol, chromatographed on alumina and eluted with benzenemethylene chloride to yield the β-(2-methyl-3-indolylmethyl)-γ-dimethylbutyric acid lactone, melting at 141.5–142.5°.

In the analogous manner the following starting materials are prepared from equivalent amounts of the corresponding phenylhydrazine:

(a) β-(2,5-dimethyl-3 - indolylmethyl)-γ-dimethylbutyric acid lactone, M.P. 173–175°,
(b) β-(2-methyl-5-fluoro-3 - indolylmethyl)-γ-dimethylbutyric acid lactone, M.P. 168–170° and
(c) β-(2-methyl-5-chloro-3-indolylmethyl)-γ - dimethylbutyric acid lactone, M.P. 183–185°.

EXAMPLE 2

In the manner described in the previous example, the following hydrochlorides of the compounds having Formula II, are prepared from equivalent amounts of the corresponding starting material; all resulting compounds are recrystallized from methanol:

| $Am_1$ | $n$ | $R_2$ | M.P.,° |
|---|---|---|---|
| $N(CH_3)_2$ | 3 | H | 159–160 |
| $N(C_2H_5)_2$ | 2 | H | (¹) |
| Pyrrolidino | 2 | H | 208–210 |
| Piperidino | 2 | H | 247–248 |
| Morpholino | 2 | H | 210–212 |

¹ Amorphous.

Using the starting materials described in Example 1 under items (a), (b) and (c) the corresponding compounds of Formula II, in which $R_2$ stands for methyl, fluoro or chloro, are obtained.

What is claimed is:
1. A pharmaceutical composition consisting essentially of a compound having the formula

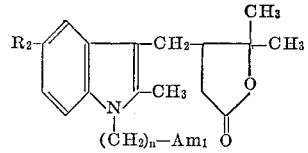

in which $n$ is the integer 2 or 3, $Am_1$ is dimethylamino, diethylamino, pyrrolidino, piperidino or morpholino and $R_2$ is hydrogen, methyl, fluoro or chloro or a therapeutically useful acid addition salt thereof and a pharmaceutical excipient.

2. A composition as claimed in claim 1, consisting essentially of the compound having the formula

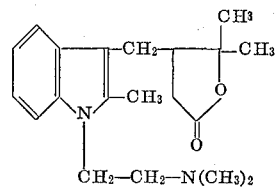

or a therapeutically useful acid addition salt thereof and a pharmaceutical excipient.

No references cited.

ALEX MAZEL, Primary Examiner
J. TOVAR, Assistant Examiner

U.S. Cl. X.R.

260—247.1, 293.4, 294.3, 295.5, 326.12, 326.14; 424— 267, 248